W. TURNBULL.
TRACTOR TRUCK MECHANISM.
APPLICATION FILED APR. 27, 1917.
1,336,387.
Patented Apr. 6, 1920.
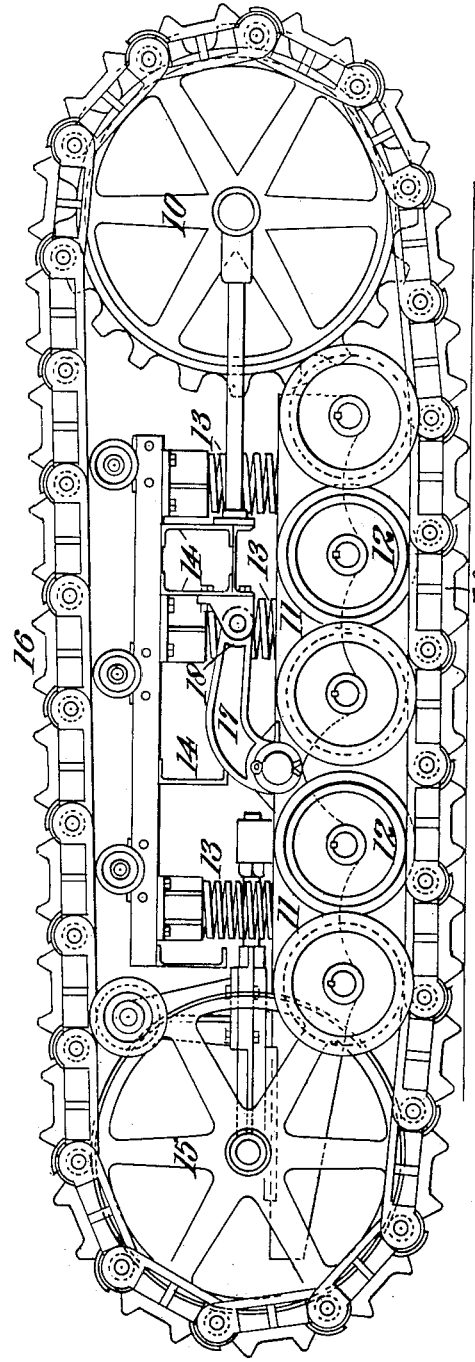
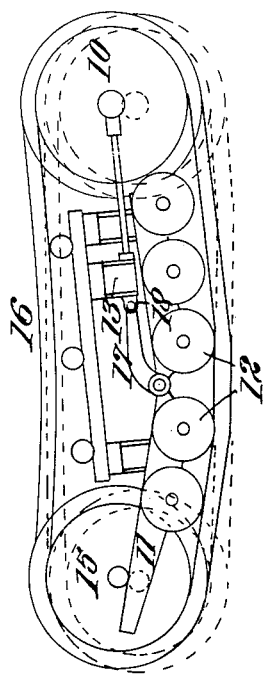
WITNESSES:
INVENTOR
William Turnbull
BY Strong & Townsend
ATTORNEYS

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACTOR TRUCK MECHANISM.

1,336,387.      Specification of Letters Patent.      Patented Apr. 6, 1920.

Application filed April 27, 1917. Serial No. 164,945.

*To all whom it may concern:*

Be it known that I, WILLIAM TURNBULL, a citizen of the United States, residing at Peoria, in the county of Peoria and State of Illinois, have invented new and useful Improvements in Tractor Truck Mechanism, of which the following is a specification.

This invention relates to tractor truck mechanisms employing endless flexible self-laying tracks, and has for its object to overcome danger of breakage of the track structure when dirt or other obstructions which require greater extension of the track than the usual amount of slack will produce become lodged between the track and sprocket or driving wheels.

The invention pertains especially to self-laying track vehicles in which the roller trucks are arranged in sections and articulated so as to produce a certain degree of inherent flexibility. The broad idea of arranging for slack in the link track has already been shown and developed in a prior application of Pliny E. Holt, Serial No. 810,671, filed January 6th, 1914.

In the present invention where articulated truck sections are employed, the desired object is accomplished by so arranging the connections between the tractor and truck frames that while the track driving and supporting wheels will be held against relative movement under ordinary conditions, an excessive strain on the chain or track imparting an inward thrust to the wheels will cause the truck to buckle and permit the track-carrying wheels to approach each other, whereby slack is produced on the chain sufficient to accommodate the obstructions.

One form which my invention may assume is exemplified in the following description and illustrated in the accompanying drawings, in which—

Figure 1 shows a side elevation of a truck mechanism embodying my invention.

Fig. 2 shows a diagram of the same illustrating the manner of producing slack in the chain.

A conventional truck mechanism is illustrated in the drawings and comprises a rear sprocket driving wheel 10 journaled upon the main frame of the tractor and an articulated roller truck frame 11 carrying rollers 12. Upon the roller truck frame are springs 13 which receive and support the main frame of the tractor through the rigid transverse beams 14. An idler wheel 15 is journaled on the forward end of one of the roller truck frame members and an endless flexible track 16 passes around the driving and idler wheels and forms a track for the rollers 12. A bent link 17 is pivoted at its rear end 18 to the frame bars 14 and at its forward end to the joint between the roller truck frame members 11.

Primarily the bent link is a thrust rod to propel the trucks as the machine is moved ahead and to maintain the idler and driving wheels spaced apart. A secondary object is to produce and reduce slack in the chain whereby to permit obstructions to be carried around between the sprocket wheels and the track.

In soft ground, such as encountered in a plowed field or sand, the tracks in turning will slide sidewise scooping up considerable dirt, gravel, etc., and when the machine is moved forwardly again this dirt and other obstructions will be carried in between the rear sprocket wheel and the track, and in order to prevent breakage of the chain track from the strains imposed thereby it is necessary that the wheels 10 and 15 move toward each other and produce slack in the chain sufficient to allow the dirt and other obstructions to be carried around the sprocket wheel with entire safety.

Under ordinary working conditions, there is no considerable tendency for the sprocket and idler wheels to approach each other and the resistance offered by the bent link or thrust rod 17 is sufficient to keep the wheels spaced apart and maintain the chain track comparatively taut, but when dirt or other obstructions get between the track and sprocket wheel, the chain tends strongly to force the wheels 10 and 15 toward each other, and since the point where the force is applied to the link 17, namely, the joint 18, is above the point of resistance or the point where link 17 connects with truck 11, the link will swing upwardly at its rear end, as shown in the diagram in Fig. 2, thus allowing the wheels 10 and 15 to move upwardly and toward each other and produce the desired slackness in the chain. The main body of the tractor is actually lifted to some extent, being supported upon the pivot point of the link 17 with the roller truck frame, and at the same time the front idler wheel is drawn upwardly swinging about the pivotal connection between the roller truck frame members. The load being centered on the inner ends of the roller truck frame members may tend to incline these members upwardly at their outer ends, producing the buckling action shown in the diagram.

This elevation of the main frame carrying upwardly with it the front end of the roller truck mechanism and causing the truck frame members to buckle produces the desired slackness in the chain and affords a yielding movement between the track and sprocket wheels so that the accumulated dirt that is passing around the wheels within the track cannot damage or collapse the structure, as is liable to be the case in the event that the front and rear wheels cannot approach each other.

It is important that the rear pivot of the thrust link be neither too yielding nor too low. If it is too low, that is, if it approaches the same horizontal plane with the joint between the truck frame members 11, it loses its function as a compensator for taking care of dirt accumulations and serves only as a thrust rod to maintain the truck and sprocket wheels out of interference with each other. At the same time if the rear pivot be placed too high the function of producing slack in the chain is again impaired and an added difficulty caused, since then the chain in passing over ordinary obstructions would prevent the inner ends of the truck frame members 11 from rising inasmuch as a tendency to separate the wheels 10 and 15 would then occur. Also if the pivotal connection between the link 17 and the tractor frame be too high, the efficacy of the link as a thrust member is impaired.

In practice, it is found that the rear pivot should be placed sufficiently above and rearward of the front pivot of the link 17 so that the force parallelogram is approximately in the ratio of 1 to 3.

From the foregoing it will be seen that the articulated truck sections with their load supporting rollers 12 running on the ground run of the track, produce an arrangement by which the load supporting rollers are arranged in groups, the front sprocket being included in one of these groups, so that the thrust link 17 provides a toggle arrangement by which the truck sections can jackknife on occasion and produce the desired slack in the track belt; in this jack-knifing one of these groups of rollers has a more or less arcuate movement with respect to the other group.

Various changes in the construction and arrangement of the several parts herein shown and described may be employed without departing from the spirit of my invention as disclosed in the appended claims.

Having thus described my invention, what I claim and desire to secure by Letters Patent is:

1. In a tractor, articulated roller truck mechanism, track carrying wheels having fixed journal bearings, a self-laying track carried by said wheels and means operable when excessive strains are applied between the track and its carrying wheels to positively cause the latter to approach each other and to produce slack in the track.

2. In a tractor, articulated roller truck mechanism, a self-laying track supported upon carrying wheels and means operable when excessive strains are applied between the track and its carrying wheels to positively cause the latter to approach each other and produce slack in the track, said means comprising a connection between the tractor frame and the roller truck mechanism.

3. In a tractor, articulated roller truck mechanism, a self-laying track therefor supported upon carrying wheels and a thrust link arranged between the tractor frame and the roller truck mechanism in a manner to positively produce slack in the track when excessive strains are applied between the track and its carrying wheels.

4. In a tractor, articulated roller truck mechanism, a self-laying track supported upon carrying wheels and means yieldable when excessive strains are applied between the track and its carrying wheels to permit the latter to approach each other to produce slack in the track, said means comprising a thrust link between the tractor frame and the joint of the roller truck mechanism.

5. In a tractor, articulated roller truck mechanism, a self-laying track supported upon carrying wheels and means yieldable when excessive strains are applied between the track and its carrying wheels to permit the latter to approach each other to produce slack in the track, said means comprising a thrust link connected at its rear end to the tractor frame and extending downwardly and forwardly to the roller truck mechanism.

6. In a tractor, a jointed truck frame carrying rollers, a self-laying track for the rollers, a driving wheel for the track journaled on the main frame of the tractor, a carrying wheel for the track journaled on the roller truck frame and a connection between the main frame of the tractor and the roller truck frame to permit said driving and carrying wheels to move in only one manner relatively to each other when an obstruction passes between the track and said wheels.

7. In a tractor, a jointed truck frame carrying rollers, a self-laying track for the rollers, a driving wheel for the track journaled on the main frame of the tractor, a carrying wheel for the track journaled on the roller truck frame, and a thrust connection between the main frame of the tractor and the roller truck frame whereby excessive tension of the track will positively cause the track driving and carrying wheels to approach each other.

8. In a tractor, a jointed truck frame carrying rollers, a self-laying track for the rollers, a driving wheel for the track journaled on the main frame of the tractor, a carrying wheel for the track journaled on the roller truck frame, and a thrust link connection between the main frame of the tractor and the joint of the roller truck frame operable when excessive strains are applied between the track and its driving wheel to permit said track driving and supporting wheels to approach each other.

9. In a tractor, a jointed truck frame carrying rollers, a self-laying track for the rollers, a driving wheel for the track journaled on the main frame of the tractor, a carrying wheel for the track journaled on the roller truck frame, and a thrust link connection between the main frame of the tractor and the joint of the roller truck frame operable when excessive strains are applied between the track and its driving wheel to permit said track driving and supporting wheels to approach each other, the point of connection of said thrust link at the rear end being above the plane of the front connection approximately one-third the distance between the two connections.

10. The combination of a self-laying track, load supporting rollers arranged in groups and running thereon, front and rear sprockets around which the track may pass, and means to cause one group of rollers to have an arcuate movement in a single direction with respect to the other group when obstructions carried around the sprockets cause excessive tension of the track.

11. The combination of a self-laying track and an articulated truck having rollers running on the track, front and rear sprockets around which the track runs, one of the sprockets being mounted on one of the truck sections, and means to exert downward pressure on the truck between its ends to cause the said sprockets to approach each other when the track is tightened.

12. The combination of a self-laying track and an articulated truck having rollers running on the track, front and rear sprockets around which the track runs, one of the sprockets being mounted on one of the truck sections, and means acting thrust fashion through the joint of the articulated truck to allow the latter to jack-knife.

13. The combination with a vehicle frame, and a self-laying track therefor, of an articulated truck running on the track, front and rear sprockets supporting the track, one of the said sprockets mounted on one of the truck sections, and yieldable connections between the main frame and the joint of the truck to produce a jack-knife effect of the truck sections and allow obstructions to be carried around the sprockets by the track.

In testimony whereof I have hereunto set my hand in the presence of two subscribing witnesses.

WILLIAM TURNBULL.

Witnesses:
EMIL F. NORELIUS,
ROBERT GOTSHALL.